(12) United States Patent
Hess et al.

(10) Patent No.: US 11,207,738 B2
(45) Date of Patent: Dec. 28, 2021

(54) MACHINE TOOL DRIVEN IN AN OSCILLATING MANNER

(71) Applicant: C. & E. Fein GmbH, Schwaebisch Gmuend—Bargau (DE)

(72) Inventors: Achim Hess, Korb (DE); Fabian Bek, Boebingen (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 788 days.

(21) Appl. No.: 16/040,929

(22) Filed: Jul. 20, 2018

(65) Prior Publication Data
US 2019/0030616 A1    Jan. 31, 2019

(30) Foreign Application Priority Data
Jul. 25, 2017   (DE) .................. 10 2017 116 823.0

(51) Int. Cl.
| | |
|---|---|
| *B23D 51/10* | (2006.01) |
| *B23D 51/16* | (2006.01) |
| *B24B 23/03* | (2006.01) |
| *B24B 23/04* | (2006.01) |
| *B25F 3/00* | (2006.01) |
| *B23B 31/10* | (2006.01) |
| *B24B 47/12* | (2006.01) |
| *B27B 19/00* | (2006.01) |
| *B24B 27/08* | (2006.01) |

(52) U.S. Cl.
CPC ............. *B23B 31/10* (2013.01); *B23D 51/10* (2013.01); *B23D 51/16* (2013.01); *B24B 23/03* (2013.01); *B24B 23/04* (2013.01); *B24B 27/08* (2013.01); *B24B 47/12* (2013.01); *B25F 3/00* (2013.01); *B27B 19/006* (2013.01)

(58) Field of Classification Search
CPC ......... B24B 23/00; B24B 23/03; B24B 23/04; B24B 27/08; B23D 51/10; B23D 51/16; B25F 3/00; B27B 19/006
USPC ........................................... 451/356
See application file for complete search history.

(56) References Cited

U.S. PATENT DOCUMENTS

| | | | |
|---|---|---|---|
| 3,554,197 A | 1/1971 | Dobbie | |
| 9,670,998 B2 * | 6/2017 | Sumi | B23D 51/16 |
| 9,975,191 B2 * | 5/2018 | Bek | B27B 19/006 |
| 10,883,579 B2 * | 1/2021 | Rubens | B26B 7/00 |

(Continued)

FOREIGN PATENT DOCUMENTS

| | | |
|---|---|---|
| DE | 10 2006 022 804 A1 | 11/2007 |
| DE | 20 2014 102 422 U1 | 9/2014 |

(Continued)

*Primary Examiner* — Eileen P Morgan
(74) *Attorney, Agent, or Firm* — Muncy, Geissler, Olds & Lowe, P.C.

(57) ABSTRACT

An oscillatingly driven machine tool having a housing in which a motor with a motor shaft is received, on which an eccentric element is accommodated, with a spindle head, with a tool spindle that is rotatably mounted about its longitudinal axis in the spindle head, on which a coupling element is non-rotatably received, which cooperates with the eccentric element for generating a movement of the tool spindle which oscillates about its longitudinal axis such that, in addition to the oscillating movement, a differing, superimposed movement is introduced into the coupling element.

19 Claims, 8 Drawing Sheets

(56) References Cited

U.S. PATENT DOCUMENTS

| | | | |
|---|---|---|---|
| 2004/0117993 A1* | 6/2004 | Armstrong | B23D 51/16 30/392 |
| 2007/0102175 A1* | 5/2007 | Lamanna | B23D 51/16 173/114 |
| 2008/0027449 A1* | 1/2008 | Gundlapalli | A61B 17/1624 606/82 |
| 2011/0000690 A1* | 1/2011 | Kildevaeld | B23D 51/16 173/29 |
| 2011/0011605 A1* | 1/2011 | Kildevaeld | B27B 19/006 173/1 |
| 2014/0068952 A1* | 3/2014 | Soreo | B24B 27/08 30/369 |
| 2014/0352995 A1 | 12/2014 | Matsunaga et al. | |
| 2016/0199919 A1 | 7/2016 | Klabunde et al. | |
| 2016/0271711 A1* | 9/2016 | Qian | B24B 47/12 |

FOREIGN PATENT DOCUMENTS

| | | |
|---|---|---|
| DE | 20 2013 006 900 U1 | 12/2014 |
| DE | 10 2014 119 141 A1 | 6/2016 |
| EP | 1882538 A2 | 1/2008 |
| EP | 2 886 271 A2 | 6/2015 |

* cited by examiner

MACHINE TOOL DRIVEN IN AN OSCILLATING MANNER

This nonprovisional application claims priority under 35 U.S.C. § 119(a) to German Patent Application No. 10 2017 116 823.0, which was filed in Germany on Jul. 25, 2017, and which is herein incorporated by reference.

BACKGROUND OF THE INVENTION

Field of the Invention

The present invention relates to an oscillatingly driven machine tool, having a housing in which a motor with a motor shaft is received, on which an eccentric element is accommodated, with a tool spindle which is rotatably mounted in the housing about its longitudinal axis, on which a coupling element is non-rotatably received, which cooperates with the eccentric element for generating an oscillating movement of the tool spindle about its longitudinal axis.

Description of the Background Art

Such machine tools which are driven in an oscillating manner, also referred to here in short as oscillating drives, typically convert the eccentric motion of the eccentric element driven by the motor spindle into a rotational oscillating movement of the coupling element fixedly connected to the motor shaft, which is usually designed as a fork which encloses a ball bearing in which the eccentric element is received.

Such oscillatory drives are usually designed to drive a tool with a high oscillation frequency, for example in the range of 5000 oscillations per minute and 30,000 oscillations per minute, at a low pivoting angle, for example in the range of 0.5° and 7° (measured from reversal point to reversal point). This way, high-precision machining of workpieces is made possible.

The tool driven in an oscillating manner produces only low reaction forces or counter torques when machining workpieces, which have to be absorbed by an operator which leads the oscillating drive. Compared with, for example, rotationally driven sawing tools, such as circular saws, oscillatingly driven saw blades entail a significantly lower risk of injury to the user. In addition, elongated saw blades can add plunge cuts, especially in workpieces made of wood, fiberglass, gypsum or the like, which is only partially possible with rotating tools.

From EP 2 886 271 A2, which corresponds to U.S. Pat. No. 9,975,191, and which is incorporated herein by reference, an oscillatingly driven machine tool is known in which the rotationally oscillating drive movement of the oscillating drive is additionally superimposed by a movement which is directed perpendicular to the longitudinal axis of the tool spindle.

From DE 10 2006 022 804 A1, a further oscillatingly driven machine tool is known, in which the tool is pivoted in addition to its oscillating movement about a pivot axis which moves back and forth along a trajectory. For this purpose, a separate slider-crank drive is provided. This, however, results in a complex structure. In addition, the additional superimposed pendulum or pivoting movement is rather disadvantageous for sawing processes.

From DE 10 2014 119 141 A1, a further oscillatingly drivable machine tool is known, in which at least one controllable actuator is provided in order to additionally superimpose at least one further movement component on the rotary oscillating movement of the tool spindle.

In the conventional art, however, an additional or separate drive is needed that usually requires several actuators, which gives rise to an expensive and expensive construction.

SUMMARY OF THE INVENTION

It is therefore an object of the present invention to provide an oscillatingly driven machine tool, in which the tool spindle is driven to oscillate about its longitudinal axis and in addition, a movement can be superimposed, wherein the structure should be as simple and robust as possible.

This object is achieved in an exemplary embodiment by an oscillatingly driven machine tool, having a housing in which a motor with a motor shaft is accommodated, on which an eccentric element is received, with a spindle head, with a tool spindle rotatably mounted about its longitudinal axis in the spindle head, on which a coupling element is non-rotatably received, which cooperates with the eccentric element for generating a movement of the tool spindle oscillating about its longitudinal axis in such a way that in addition to the oscillating movement, a superimposed movement deviating from the latter is introduced into the coupling element.

The superimposed movement can be generated by the drive with the eccentric element, without requiring a separate drive for this purpose.

Since in this way, an additional drive for generating the superimposed movement can be omitted, the result is a significantly simplified design as compared to conventional designs.

The tool spindle can be rotatably mounted in the housing by means of two bearings, preferably in the region of its two ends, and is additionally non-rotatably mounted linearly movable to the longitudinal axis.

In this way, a movement of the tool spindle can be introduced perpendicular to its longitudinal axis in the coupling element.

The coupling element can be a lever which is fixed between the two bearings on the tool spindle.

The coupling element can be guided by a guide element in a slotted guide for generating the superimposed movement.

In this way, the coupling element is overlaid by a movement generated within the slotted guide by the movement of the guide element.

By varying the shape of the slotted guide, differing movements can be realized.

Also, by interchanging the slotted guide on an oscillatingly driven machine tool of a given construction, differing superimposed movements can be achieved.

The slotted guide can be arranged and designed such that it is symmetrical with respect to a line of symmetry running through the longitudinal axis of the tool spindle between the two reversal points of the coupling element.

In this way, in each case starting from a central position of the oscillatory movement on both sides, the additionally superimposed linear movement exhibits the same amplitude.

Such an embodiment is particularly suitable when the machine tool is used, for example, for driving a sawing tool.

In principle, of course, deviating arrangements are conceivable that are not symmetrical in order to meet certain special requirements.

For example, the slotted guide can be interchangeable.

In this way, differing superimposed movements can be generated.

On the eccentric element, a ball bearing can be accommodated according to a further embodiment of the invention, which is held on its outer side in the fork-shaped coupling element.

In such an embodiment, the design of the oscillating drive itself corresponds to the conventional design known from the prior art.

The guide element and the slotted guide can be moved between an engagement position, in which the guide element is guided in the slotted guide to produce a superimposed movement, and an inactive position, in which the guide element is disengaged from the slotted guide and also linear mobility is blocked.

In this way, the superimposed movement can be switched on or off.

For this purpose, for example, the slotted guide can be adjustable by via a drive, for example, via a threaded screw, in such a way that the guide element is disengaged from the slotted guide and thus no additional movement is superimposed on the oscillatory motion. In this case, the linear mobility of the tool spindle can be blocked in the inactive position of the slotted guide so that the tool spindle in this case is only rotatably oscillatingly driven and movable.

The guide element can be brought into engagement with differing slotted guides or with differing sections of a slotted guide in order to produce differing superimposed movements.

As a result, differing superimposed movements can be realized or a superimposed movement can be completely avoided.

The eccentric element can be designed as a ball head which is guided in an inner slotted guide in the coupling element.

In this way, the ball bearing on the eccentric element and the external slotted guide are omitted and instead, the eccentric element is designed as a ball head, which is guided directly in the inner slotted guide in the coupling element.

This offers a particularly simple construction.

Since in this case, a movement component is also generated in the axial direction, it is advantageous here to additionally secure the motor shaft against displacement in the axial direction. Furthermore, it makes sense for this purpose that the front armature bearing is held in both axial directions.

The tool spindle can protrude out of the housing to the outside and is sealed from the housing in the region of its exit point with a membrane made of an elastomeric material.

In this way, a secure seal of the tool spindle can be ensured to the outside, even though the tool spindle performs not only a rotational oscillating movement, but also a movement perpendicular to its longitudinal axis.

The slotted guide can be designed such that the superimposed linear movement that is perpendicular to the longitudinal axis of the tool spindle has a maximum deflection when the coupling element is in the middle position between the two reversal points of the oscillatory motion.

It has been found that such a configuration is particularly suitable when the machine tool is used for sawing. In this way, a very good work progress can be generated with minimal feed force.

The tool spindle can have at its free end a tool holder for fastening a tool, for example, a sawing or grinding tool.

This may be any interface between the tool and tool spindle known in the prior art, which preferably ensures a positive and/or non-positive attachment of the tool on the tool spindle. In particular, a tool holder with a three-dimensional design can also be provided, as known, for example, from the German utility model document DE 202013006900 U1, which corresponds to US 2016/0199919, and which is hereby incorporated by reference.

A controller can be provided which is coupled to the engine in such a way that control of the engine speed takes place in response to one or more predetermined parameters.

Here, for example, the rotational speed of the motor can be detected by a detector, and the controller may be designed for starting the motor at a first speed and for increasing the rotational speed to a second speed, which is higher than the first speed, when a load of the motor is detected.

In this way, a so-called idling reduction can be realized, whereby initially a starting cut to a workpiece is produced during a sawing operation at a low speed, and then the speed is increased without the control over the cut being lost, because the saw blade is guided in the cut already generated.

In this way, very fast work progress can be obtained without the risk of the tool running away.

In this case, the second (increased) speed may be predetermined or be adjustable up to a maximum speed as a function of a particular tool.

The controller can be designed such that when a decrease in the load is detected, the speed of the motor is also lowered, if applicable, until the first speed is again reached.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
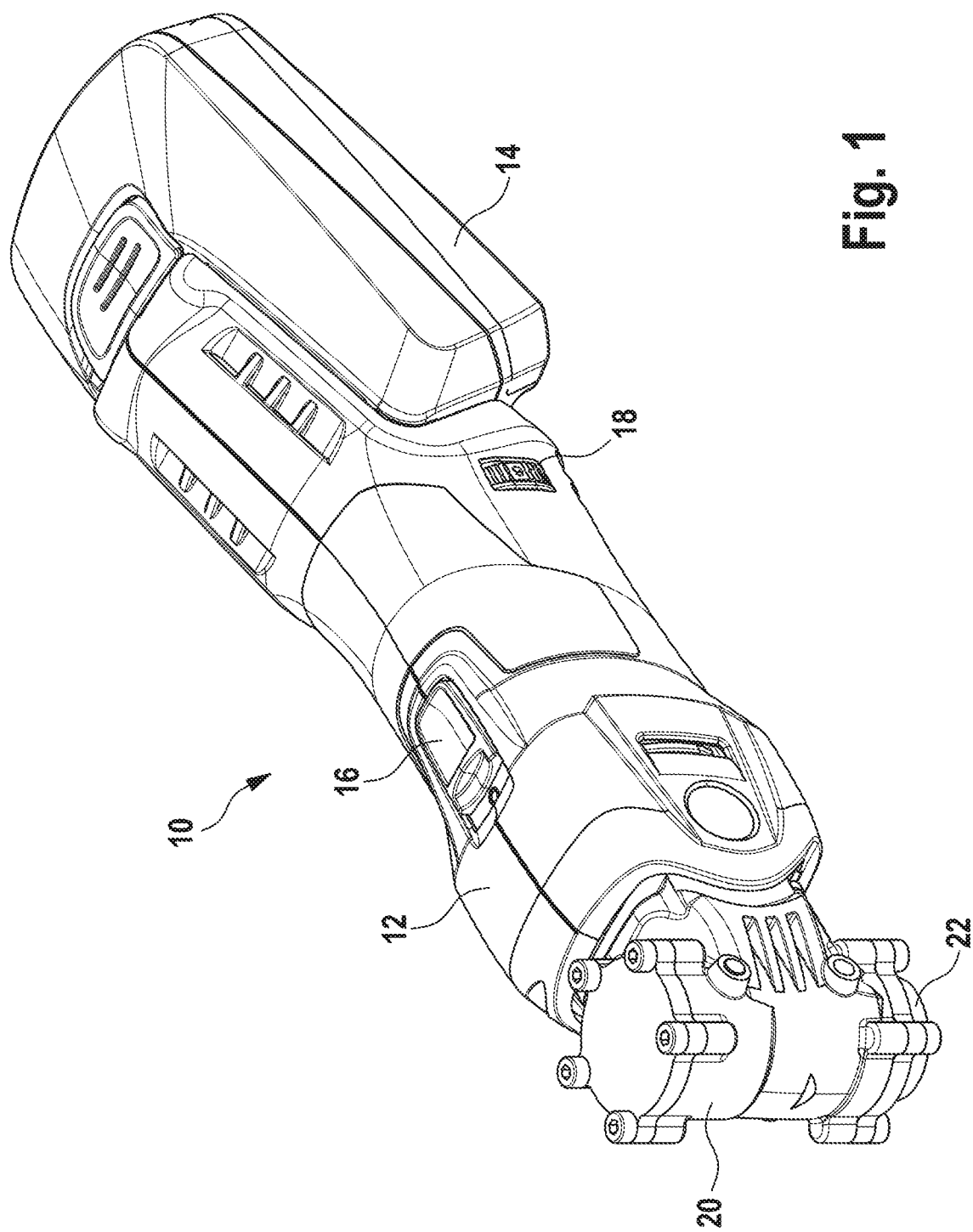
FIG. 1 is an overall perspective view of a machine tool according to an embodiment of the invention.

FIG. 1 shows a machine tool according to the invention in the form of a hand tool, which is designated overall by the numeral 10. The machine tool 10 has an elongated housing 12 which can be gripped by one hand and at the top of which a switch 16 is provided for switching on and off.

At the front end of the housing 12, a spindle head 20 is integrally formed, from which a tool spindle 22 projects downwards with a free end. At the rear end facing away from the spindle head 20, a replaceable battery pack 14 is provided to power the machine. It is understood that, of course, a networked design could be used instead.

On the left side, an adjusting wheel 18 is additionally recognizable, which is designed to adjust the maximum speed of the drive motor.

The detailed structure of the machine tool 10 will now be described with reference to the following figures.

Figure 2:
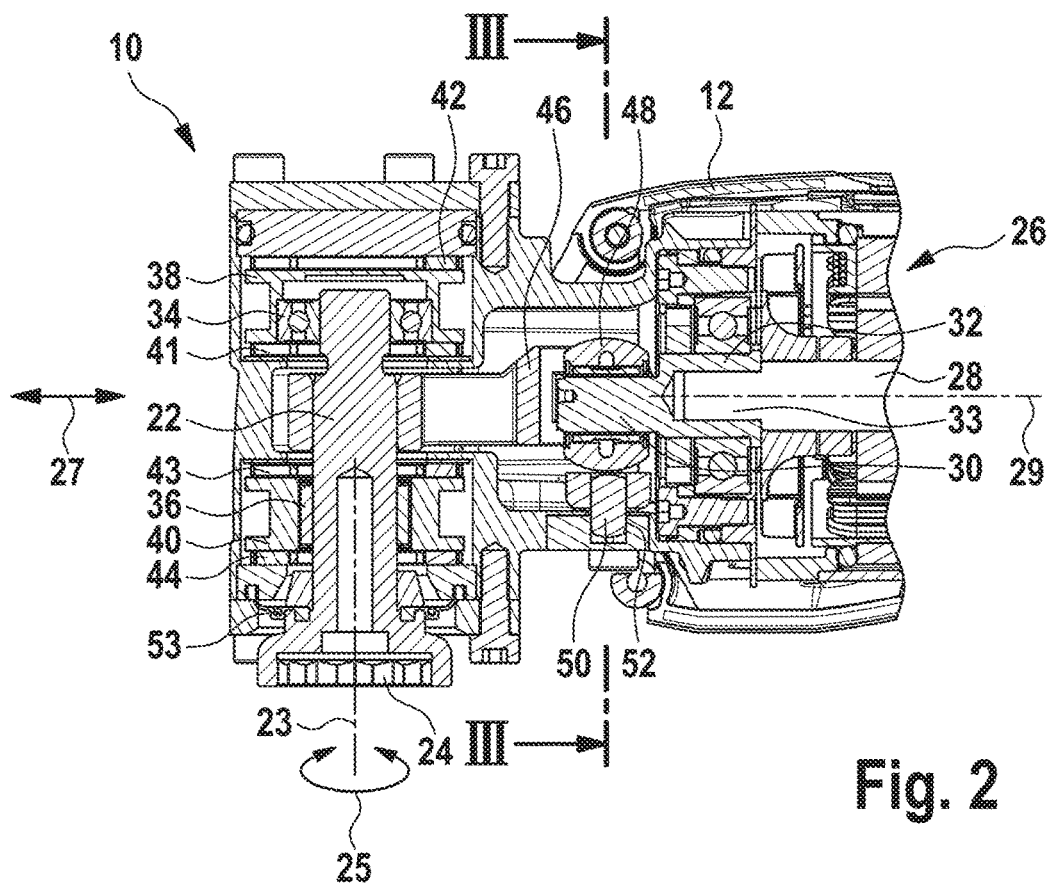
FIG. 2 is a partial section through the machine tool of FIG. 1, through the spindle head and through a part of the motor.

FIG. 2 shows a longitudinal section through the outer end of the machine 10.

In the housing 12, a motor 26 is accommodated. At the outer end 33 of the motor shaft 28, an eccentric element 30 in the form of an eccentric pin with a hollow cylindrical extension 32 formed thereon, is attached via a press fit. The motor shaft 28 is mounted with the outer periphery of the extension 32 in a ball bearing.

In the spindle head 20, the tool spindle 22 is held with its longitudinal axis 23 at right angles to the longitudinal axis 29 of the motor shaft. The tool spindle is rotatably mounted in the region of its two ends by means of two bearings 34, 36. In addition, the tool spindle 22 is movably mounted in a direction perpendicular to its longitudinal axis 23 and parallel to the longitudinal axis 29 of the motor shaft 28. For this purpose, one of the bearings 34 is held at the inner end of the tool spindle 22 in a bearing block 38 which is mounted by means of two axial needle bearings 41, 42 and two linear guides and is slidable in a direction parallel to the longitudinal axis 29 of the motor shaft 28. In a corresponding manner, the other bearing, designed as a needle bearing 36, is held in a bearing block 40 which is supported by two axial needle bearings 43, 44 and two linear guides and is movable in the direction perpendicular to the longitudinal axis 23 of the tool spindle and parallel to the longitudinal axis 29 of the motor shaft 28.

The tool spindle 22 can thus be rotationally oscillatingly driven about its longitudinal axis 23 (see double arrow 25) and additionally moved in the direction perpendicular to its longitudinal axis 23 and parallel to the longitudinal axis 29 of the motor shaft 28 (see double arrow 27).

To generate the rotational oscillating and superimposed linear movement, a coupling element 46 in the form of a lever is held rotationally fixed with one end on the tool spindle 22 between the two bearings 34, 36 by means of a press fit.

Figure 3:
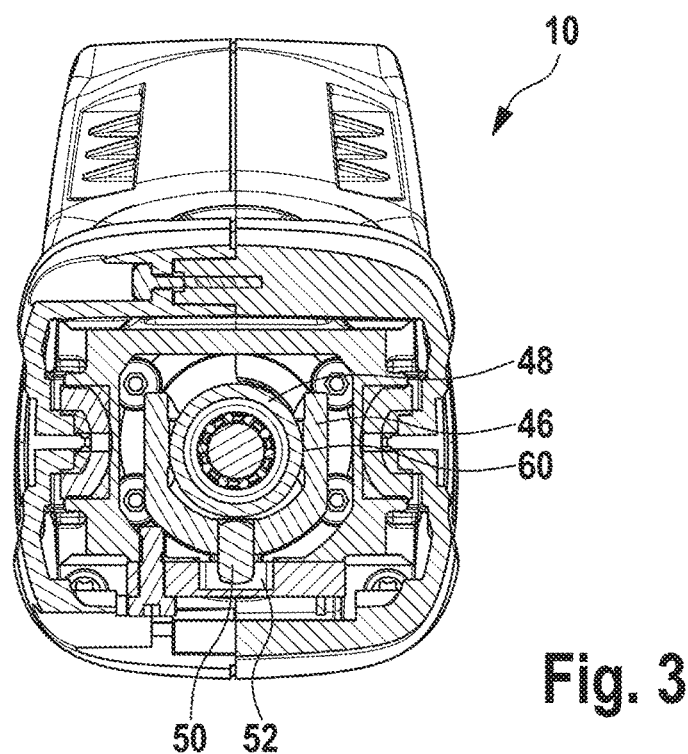
FIG. 3 is a section through the machine tool of FIG. 2 along the line III-III.
Figure 4:
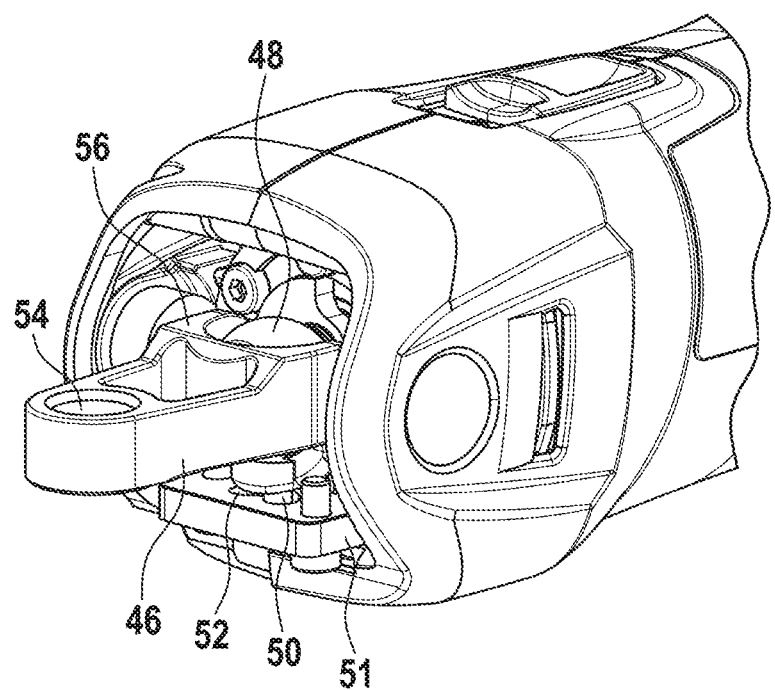
FIG. 4 is a partially cutaway perspective view, in which in particular, the coupling element with the ball bearing guided therein and the guide element as per the slotted guide are visible.
Figure 5:
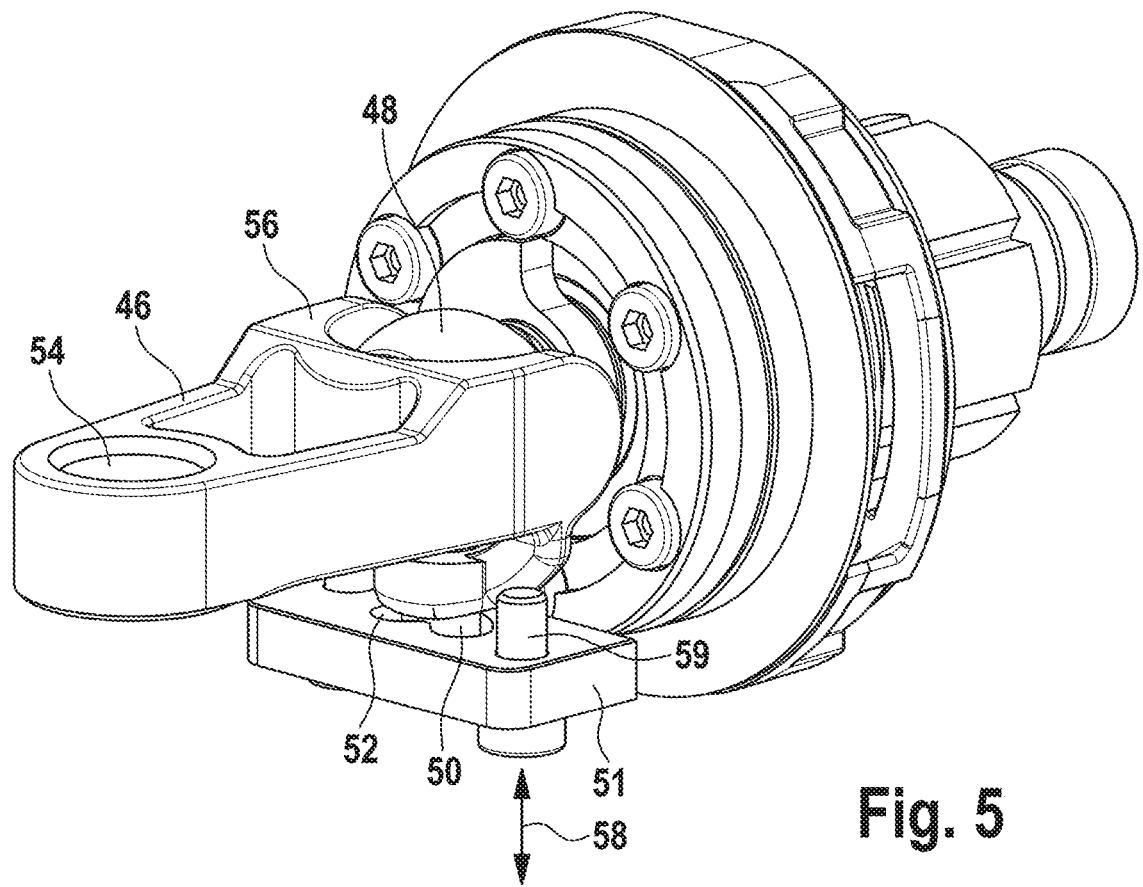
FIG. 5 is an enlarged view of FIG. 4, which is further cut free to make the oscillating drive more visible.
Figure 6:
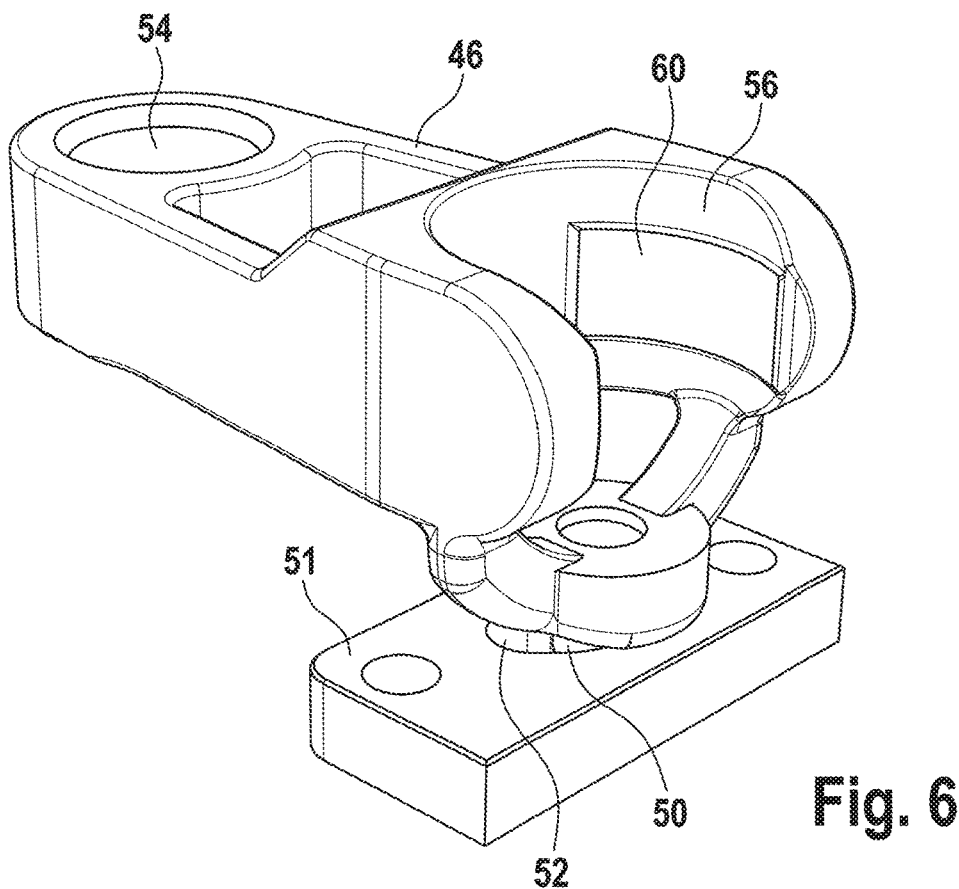
FIG. 6 is a view of the coupling element of FIG. 5 as seen from the fork-shaped seat for the ball bearing, together with the associated slotted guide.
Figure 7:
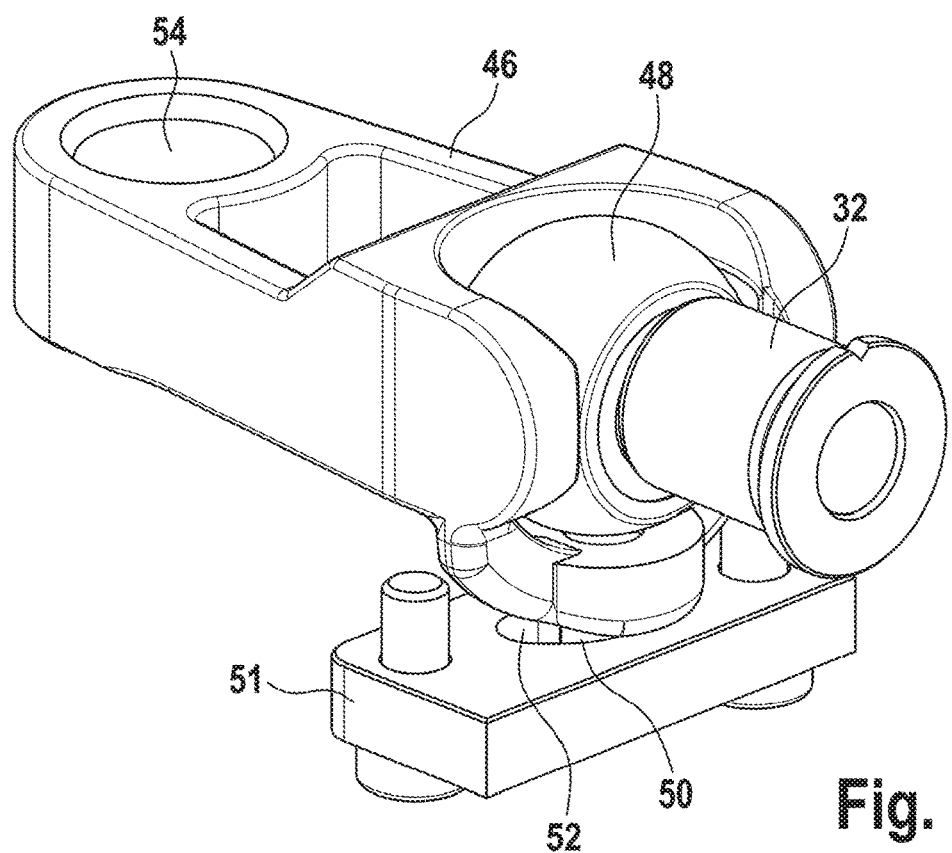
FIG. 7 is an illustration of the coupling element together with the associated slotted guide, wherein in addition, the ball bearing can be seen together with the eccentric element received therein.

The coupling element 46, the shape of which is shown in more detail in particular in FIGS. 4 and 5, has at one end a cylindrical opening 54 (FIGS. 4, 5) which allows for connection to the tool spindle 22 by a press fit. The opposite second end is designed in the form of a fork 56. On one side of this fork (underside), this fork 56 is extended downwards and, according to FIG. 3, has a U-shaped cross-section. On the eccentric 30, a ball bearing 48 is held, which is accommodated in a seat surface 60 of an inner side of the fork 56.

Below the fork 56, a block 51 is held on the housing 12 with a slotted guide 52, in which a guide element 50 in the form of a pin engages, said pin protruding from the lower end of the fork 56 downwards.

If the eccentric 30 is driven by the motor shaft 28, a rotationally oscillating movement of the tool spindle 22 about its longitudinal axis 23 is produced on the one hand via the ball bearing 48 and the coupling element 46 (see double arrow 25). On the other hand, in the slotted guide 52, a superimposed oscillating linear movement (double arrow 27) is generated on the tool spindle 22, perpendicular to its longitudinal axis 23 and parallel to the longitudinal axis 29 of the motor shaft 28, by the engagement of the guide element 50 which is fixedly connected to the fork 56. Due to the arrangement and shape of the slotted guide 52, the trajectory of the superimposed oscillating linear motion can be influenced.

Figure 12:
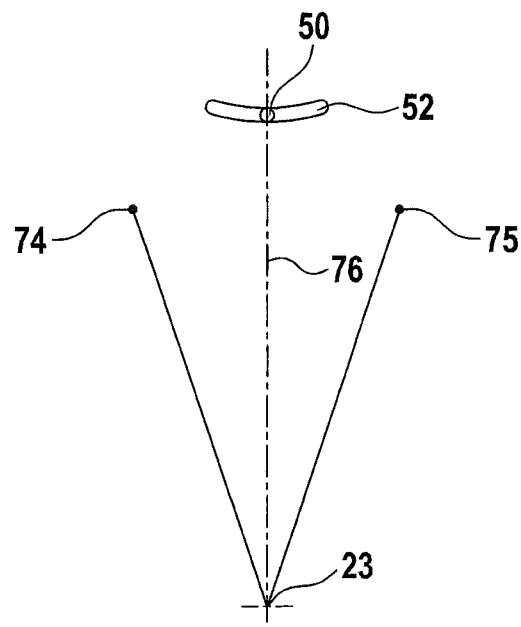
FIG. 12 is a schematic representation in which the symmetrical arrangement of the slotted guide is shown with respect to a line of symmetry between the two reversal points of the coupling element.

According to a preferred embodiment of the invention, the slotted guide 52 is arranged and designed such that it is symmetrical with respect to a line of symmetry 76 extending through the longitudinal axis 23 of the tool spindle 22 between the two reversal points 74, 75 of the coupling element 46 (see FIG. 12). In FIG. 12, the angle between the two reversal points (which is between 0.5° and 7°) is shown clearly exaggerated for better visibility.

In this case, at the same distance to the respective reversal point 74, 75 of the oscillatory motion, the linear movement generated by the slotted guide 52 has the same stroke on both sides, respectively.

Such a configuration is advantageous if the machine tool is to be used to drive a sawing tool.

For this purpose, preferably the slotted guide 52 is further formed such that the linear movement which is superimposed perpendicular to the longitudinal axis 23 of the tool spindle 22 has a maximum deflection when the coupling element 46 is located in a middle position between its two reversal points 74, 75.

It has been found that such a configuration is particularly suitable in order to produce very good work progress in sawing work with minimal feed force.

Figure 10:
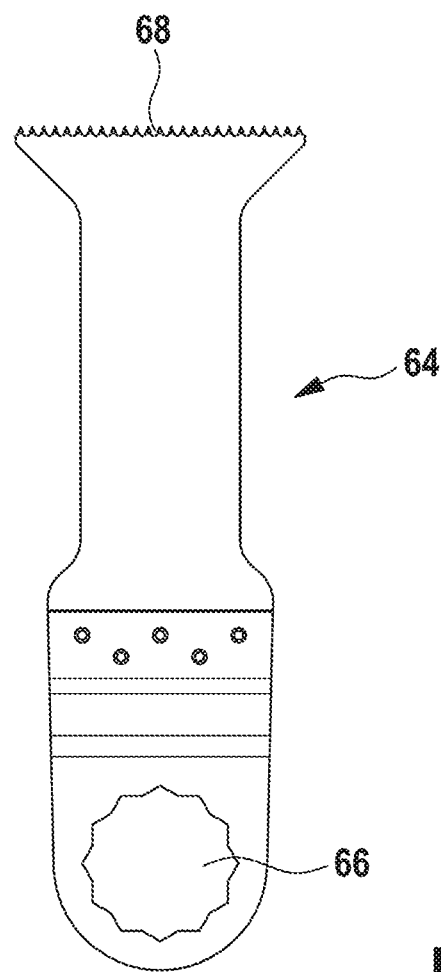
FIG. 10 is an exemplary representation of a sawing tool, which can be mounted on the outer end of the tool spindle.

FIG. 10 shows an exemplary tool 64 in plan view, which can be used as a sawing tool. It has a saw-toothed cutting edge 68 which runs concentric to a mounting opening 66 for fixing the tool 64 on the tool holder 24 on the outer end of the tool spindle 22.

It is understood that the shape of the mounting opening 66, which is shown here in a polygonal shape only by way of example, is adapted in a suitable manner to the shape of the associated seat 24 on the tool spindle 22. In the illustrated embodiment, a fastener is additionally used for attachment of the tool 64, which fastener engages through the mounting opening 66 of the tool 64 and is fixed in the tool spindle to guarantee a positive and/or non-positive connection. However, as the details of such attachment are known, a closer description is omitted at this point.

As indicated by way of example in FIG. 5 by a double arrow 58, it is possible, for example, by a movement of the block 51 in which the slotted guide 52 is formed, to displace the slotted guide 52 between the engagement position shown in FIG. 5, in which the guide element 50 engages in the slotted guide 52, and an inactive position.

In the inactive position, the block 51 is moved so far away from the guide element 50 that the guide element 50 is no longer engaged in the slotted guide 52. In this position, therefore, only the rotational oscillating movement is transferred to the tool spindle 22, but no additional linear motion.

Such a movement can be generated, for example, by replacing the mounting screw 59 visible in FIG. 5 with a threaded spindle that meshes with a thread in the block 51 and thus allows an adjustment in the direction of the double arrow 58. In this case, a block is provided to block the linear mobility of the tool spindle in the inactive position of the slotted guide, so that in this case the tool spindle is only rotationally oscillatingly driven and is movable.

Figure 8:
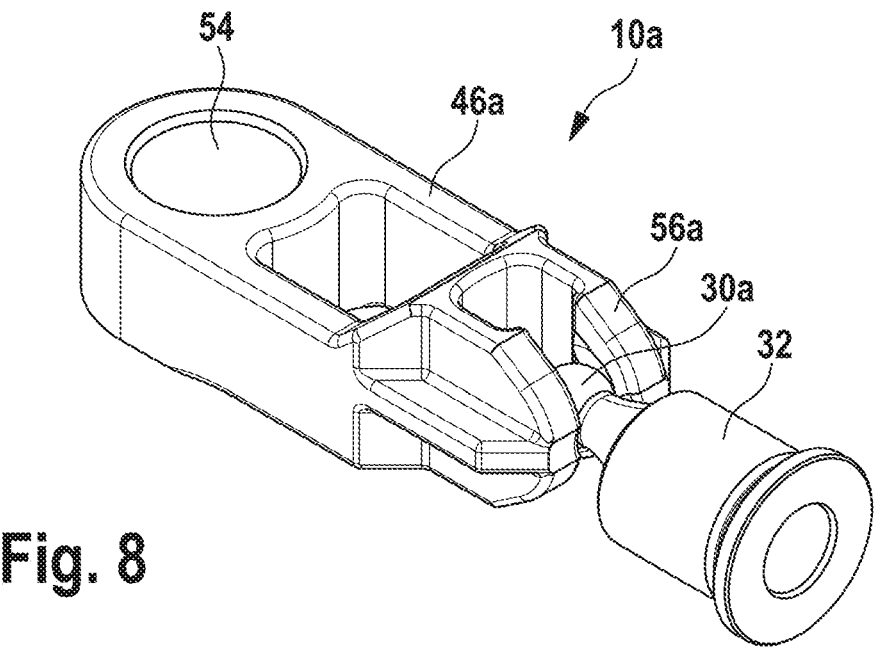
FIG. 8 is an illustration of an alternative embodiment of the invention, wherein the eccentric element is formed at its end as a ball head, which is guided in an inner slotted guide at the end of the coupling element.
Figure 9:
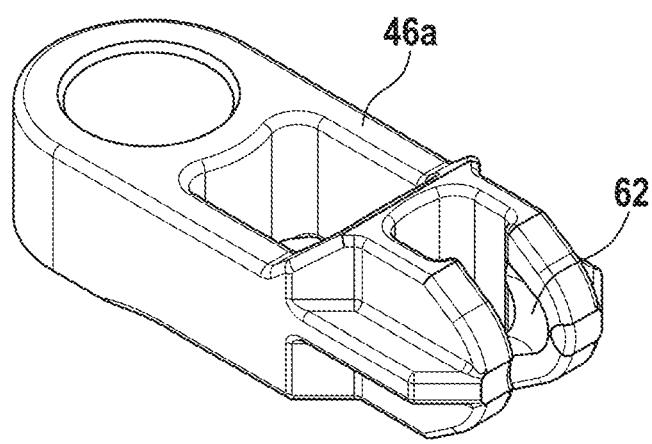
FIG. 9 is the coupling element according to FIG. 8, but without the eccentric head.

FIGS. 8 and 9 show a modified embodiment of the invention, in which instead of the slotted guide 52, which cooperates with the guide element 50, a connection directly between an eccentric 30a and a fork 56a of a coupling element 46a is provided.

For this purpose, the eccentric 30a is formed at its outer end as a ball head, which engages in an inner slotted guide 62 (see FIG. 9) at the end of the coupling element 46a in the area of the fork 56a. Due to the shape of the inner slotted guide 62 in connection with the eccentric 30a, the movement is fixed. The movement curve can be adjusted by the design of the inner slotted guide 62.

As can be seen from FIG. 2, the tool spindle 22 is sealed at its outer end by a membrane 53 made from an elastomeric material, since the tool spindle 22 also moves in an oscillating linear manner.

In order to support the conducting of sawing work, the machine tool 10 is preferably additionally equipped with a so-called idling reduction.

Figure 11:
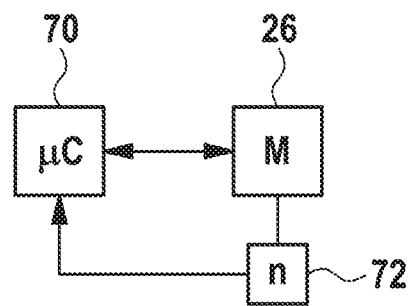
FIG. 11 is a simplified circuit diagram to illustrate the idling reduction of the engine.

A central controller 70, which is shown schematically in FIG. 11 and which cooperates with the motor 26, is designed such that at the beginning of a saw cut, the tool 64 is operated at a low speed $n_1$, whereby the tool 64 can be guided very well. If the controller 70 coupled to the motor 26 detects that the motor 26 is loaded, the speed is slowly increased to a higher speed $n_2$ until, where appropriate, a pre-set maximum speed is reached.

This allows for very fast work progress to be achieved without control of the cut being lost, since the saw blade is guided in the already produced cut. If the load on the machine declines, the speed is again decreased until finally the lower level $n_1$ is reached again.

Figure 13:
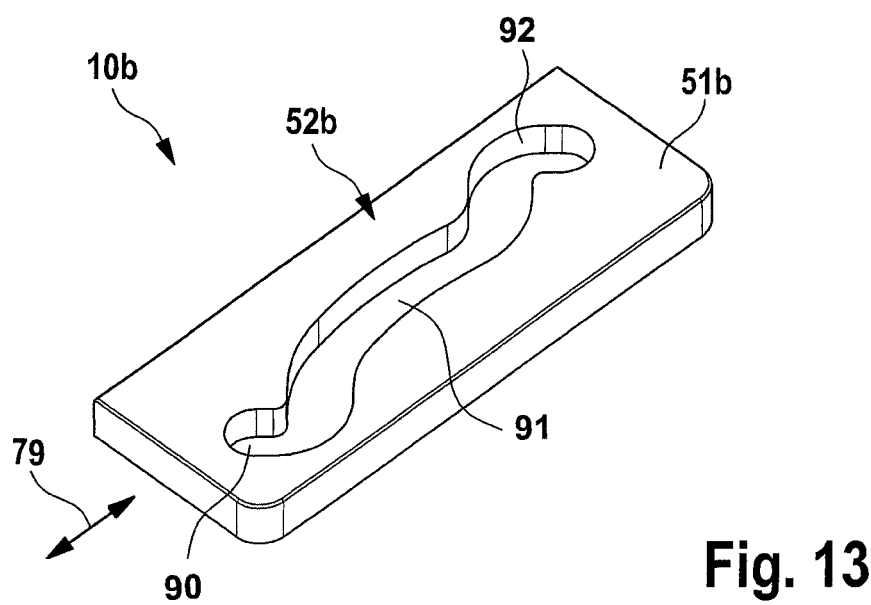
FIG. 13 is a further modification of a machine tool according to the invention, wherein here only a modified slotted guide is shown in a perspective view.

FIG. 13 describes a further modification of a machine tool according to the invention generally designated by 10b. Shown is only a block 51b with a slotted guide 52b with a middle region 91 and a first end region 90 and a second end region 92. The block 51b is displaceable in the direction of its longitudinal extent, such as indicated by a double arrow 79.

As a result, either the middle region 91 or one of the two end regions 76, 78 can be brought into engagement with the associated guide element 50 to create differing superimposed movements. If desired, the middle region 91 can also be used to generate no superimposed movement.

Figure 14:
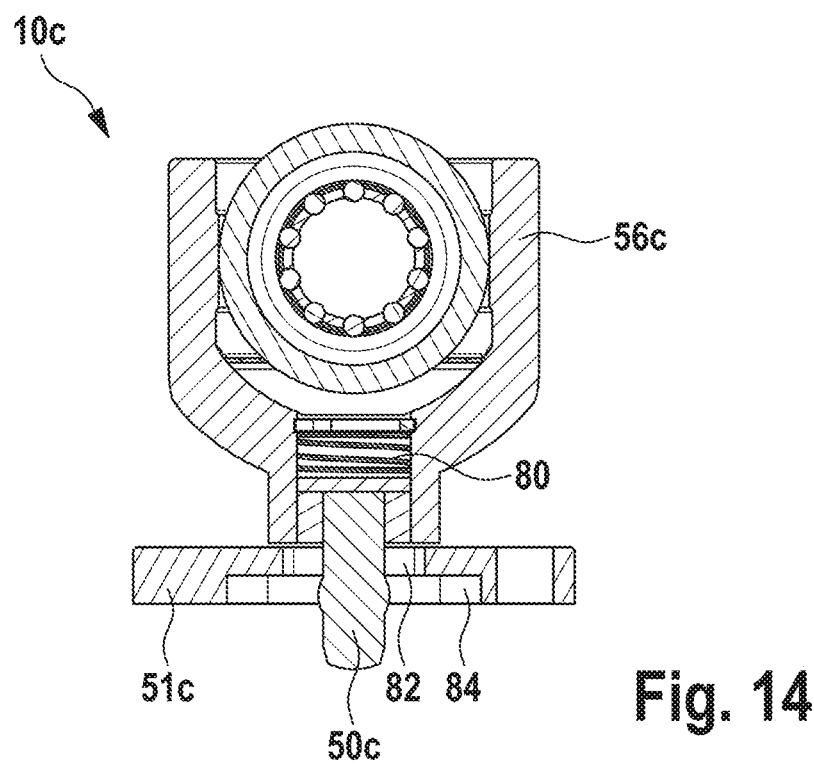
FIG. 14 is a section through a further modification of a machine tool according to the invention in the region of the fork.
Figure 15:
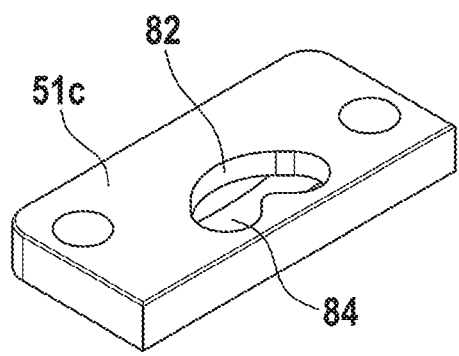
FIG. 15 is a perspective view of the associated slotted guides from above.
Figure 16:
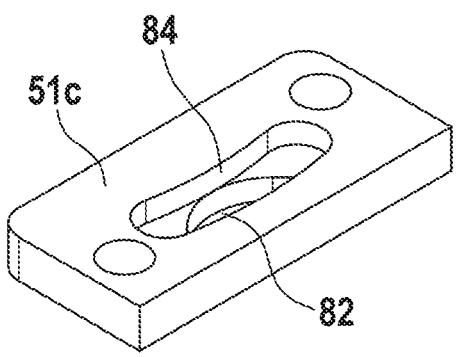
FIG. 16 is a perspective view of the associated slotted guides from below.

FIGS. 14 to 16 show a further modification of the inventive machine tool, which is designated overall by 10c. From the section in FIG. 14, it can be seen that in the lower end of the fork 56c, a guide element 50c in the form of a tappet is held axially displaceable against the force of a spring element 80. The guide element 50c may be brought into engagement with either an upper slotted guide 82 or with a lower slotted guide 84 on the underside of the block 51c. This results in differing superimposed movements, depending on whether the upper slotted guide 82 or the lower slotted guide 84 is engaged.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An oscillatingly driven machine tool comprising:
a motor with a motor shaft;
a housing in which the motor with the motor shaft is accommodated;
an eccentric element attached to an outer end of the motor shaft;
a spindle head attached to a front end of the housing;
a tool spindle rotatably mounted about a longitudinal axis in the spindle head; and
a coupling element that couples the eccentric element with the tool spindle,
wherein a first end of the coupling element is non-rotatably received on a first end of the tool spindle and a second end of the coupling element engages with the eccentric element,
wherein the coupling element cooperates with the eccentric element for generating an oscillating movement of the tool spindle about a longitudinal axis of the tool spindle and the coupling element introduces a linear movement into the tool spindle, such that the oscillating movement is superimposed with the linear movement, and
wherein the tool spindle extends perpendicular to the motor shaft.

2. The machine tool according to claim 1, wherein each end of the tool spindle is rotatably mounted in the housing via a bearing, and the bearing at each end of the tool spindle is mounted linearly movable perpendicular to the longitudinal axis of the tool spindle.

3. The machine tool according to claim 2, wherein the coupling element is a lever which is fixed between the bearing at each end of the tool spindle.

4. The machine tool according to claim 3, wherein, for introducing the linear movement, a guide element of the coupling element is guided in a slotted guide, and wherein the slotted guide is provided in a block attached to the housing.

5. The machine tool according to claim 4, wherein a slot shape of the slotted guide is arranged and configured such that the slot shape is symmetrical with respect to a symmetry line extending through the longitudinal axis of the tool spindle between two reversal points of the coupling element.

6. The machine tool according to claim 4, wherein the slotted guide is interchangeable with a different slotted guide having a different slot shape.

7. The machine tool according to claim 1, wherein a ball bearing is accommodated on a first end of the eccentric element, wherein a second end of the coupling element has a U-shaped cross-section, and wherein the ball bearing is held on an inner seat surface of the U-shaped cross-section of the coupling element.

8. The machine tool according to claim 4, wherein a threaded spindle of the housing is provided to move the guide element and the slotted guide between an engagement position, in which the guide element is guided in the slotted guide for generating the linear movement, and an inactive position, in which the guide element is disengaged from the slotted guide and the linear movement is blocked.

9. The machine tool according to claim 4, wherein the coupling element further comprises a spring for bringing the guide element into engagement with differently shaped sections of the slotted guide to produce differing versions of the linear movement.

10. The machine tool according to claim 8, wherein the slotted guide is displaceable along a longitudinal extension direction of the slotted guide.

11. The machine tool according to claim 1, wherein a second end of the coupling element has a U-shaped cross-section, wherein the eccentric element is a ball head that is guided in an inner slot provided in the U-shaped cross-section of the coupling element, and wherein the introducing of the linear movement into the tool spindle is provided by the guiding of the ball head in the inner slot.

12. The machine tool according to claim 1, wherein the tool spindle is secured against displacement in the axial direction.

13. The machine tool according to claim 1, wherein the tool spindle protrudes outwardly from the spindle head at an exit point and is sealed at the exit point a membrane made of an elastomeric material.

14. The machine tool according to claim 4, wherein the slotted guide is formed such that the linear movement that is perpendicular to the longitudinal axis of the tool spindle has a maximum deflection when the coupling element is located in a middle position between the two reversal points of the oscillating movement.

15. The machine tool according to claim 1, wherein a second end of the tool spindle has a tool holder for fastening a tool, a sawing tool, or a grinding tool.

16. The machine tool according to claim 1, further comprising a controller that is coupled to the motor such that a control of a motor speed is carried out as a function of one or more predetermined rotational speeds of the motor.

17. The machine tool according to claim 16, wherein a detector detects a rotational speed of the motor, and wherein the controller is designed to start the motor at a first rotational speed, and to increase the speed to a second speed, which is higher than the first speed when a load of the motor is detected.

18. The machine tool according to claim 17, wherein the controller is designed to lower the rotational speed of the motor when a decrease in the load is detected.

19. The machine tool according to claim 4, wherein the guide element is a pin that is integral with, and protrudes downwardly from, the second end of the coupling element.

* * * * *